Figure 1:
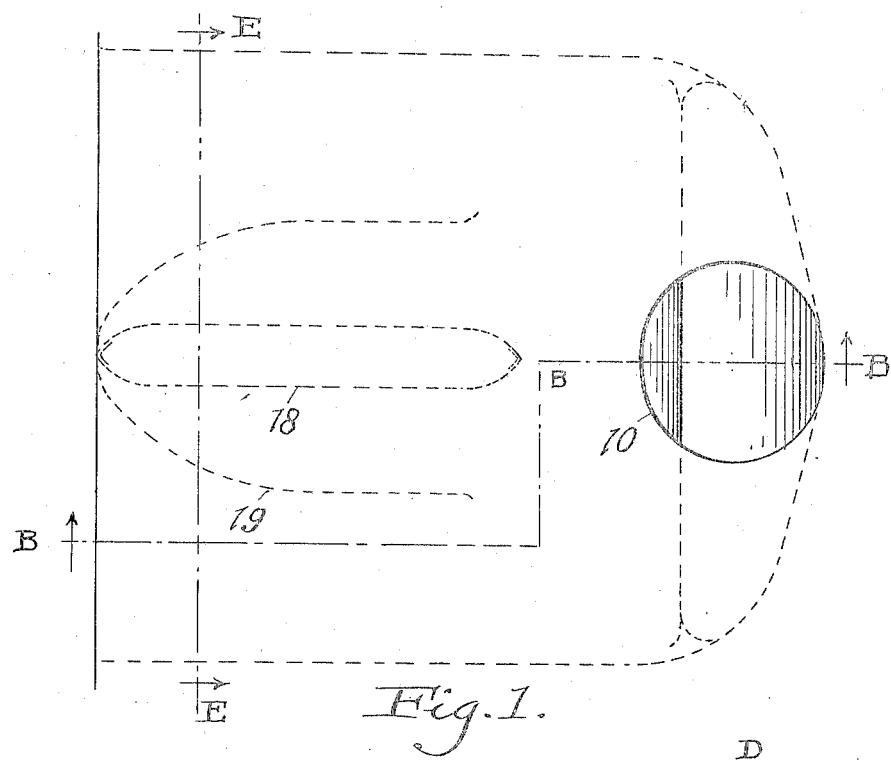

Oct. 14, 1924.

H. E. POPP 1,511,364

DRAFT TUBE

Filed Sept. 10, 1923    2 Sheets-Sheet 1

Inventor
Harry E. Popp.
Thurston Rice & Hudson
attys

Oct. 14, 1924.  
H. E. POPP  
DRAFT TUBE  
Filed Sept. 10, 1923   2 Sheets-Sheet 2

1,511,364

Inventor
Harry E. Popp.
Thurston Rice & Hudson
attys

Patented Oct. 14, 1924.

1,511,364

UNITED STATES PATENT OFFICE.

HARRY E. POPP, OF CLEVELAND, OHIO, ASSIGNOR, BY MESNE ASSIGNMENTS, TO NEWPORT NEWS SHIPBUILDING & DRY DOCK COMPANY, OF NEWPORT NEWS, VIRGINIA, A CORPORATION OF VIRGINIA.

DRAFT TUBE.

Application filed September 10, 1923. Serial No. 662,010.

*To all whom it may concern:*

Be it known that I, HARRY E. POPP, a citizen of the United States, residing at Cleveland, in the county of Cuyahoga and State of Ohio, have invented a certain new and useful Improvement in Draft Tubes, of which the following is a full, clear, and exact description.

This invention relates to draft tubes such as are employed in connection with water turbines to conduct away from the turbine the water leaving the turbine runner.

The function of the draft tube of a water turbine is primarily to regain the residual energy of the water leaving the runner. The discharge of water from the runner takes place at high velocity which in some cases represents a large portion of the total head or energy acting on the turbine. In the draft tube the water should be gradually decelerated as it passes through the tube, and be finally discharged into the tailrace at a relatively low velocity. In this way the energy of the water existing as velocity head as it enters the draft tube can be converted into pressure head and a partial vacuum is produced in the tube where the water leaving the runner enters the tube. The effect of this vacuum or negative head below the runner is of course equivalent to an equal amount of positive head above it.

The draft tube has other important functions, one of which is to permit the turbine to be set above tail water without loss of head, and additionally if a tube is properly designed it offers a convenient way for turning the water, which is generally discharged vertically downward from the turbine, through approximately 90° so that it leaves the draft tube in a horizontal direction down stream of the power house.

Generally speaking, previous practice for accomplishing these results has been to use a tube gradually flaring on all sides and bent to a comparatively long radius through 90°. This type of tube has not been entirely satisfactory nor as efficient as desirable because the water in making the turn has high velocity at the outer radius or outer wall of the bend and low velocity or even negative velocity at the inner radius. This unequal distribution of velocities extends through nearly the entire length of the tube resulting in serious eddying and loss of energy. Attempts have been made to improve these tubes by using a shorter radius of bend, and some increase of efficiency has thereby been obtained. These tubes and all other tubes of which I am aware, have, however, been designed with walls flaring on all sides, and the water does not always follow the flare or keep the tube uniformly filled.

The present invention is particularly adapted, though not necessarily confined to vertical turbines, since it enables the water to be turned through 90° after leaving the runner and its residual energy to be regained with a minimum loss.

In brief, it may be said that the object of the invention is to provide certain improvements which increase the efficiency of draft tubes generally, and particularly of the curved type, wherein the tube has a bend or elbow to turn the water through an angle which is generally 90°. Otherwise stated, it is the object to provide a tube wherein there is a maximum regain of energy and wherein the water issues from the outer or discharge end of the tube at low velocity and at practically uniform velocity at all points of the discharge end.

A still further object is to obtain these results with a tube, which is inexpensive to construct, and wherein the cost of form work and excavation is comparatively small when the tube is constructed of concrete.

The invention may be briefly summarized as consisting in certain novel details of construction, and in certain novel structural characteristics which will be described in the specification and set forth in the appended claims.

Before referring to the drawings, I might state that the tube formed in accordance with my invention embodies certain principles or structural characteristics which separately or in co-operation with one another contribute to the attainment of the excellent results which are obtained from the tube, and which I believe to be novel in the draft tube art.

These are as follows:—

First.—The tube is preferably not flared in all directions or on all sides, but in all or practically all parts of the tube it flares in one plane or in one direction at any given portion of its length, this being useful particularly in tending to prevent the water from leaving the surface of the tube.

Second.—The shape of the tube is such that above or in advance of the bend the water is brought to a relatively thin sheet so as to enable the bend to be made as short as possible with little difference between the inner and outer radii of the bend. The effect of this is to minimize the unequal distribution of velocities around the bend, to reduce the swirling action which the water has after leaving the runner, and to prevent whatever disturbance exists during the turning of the water from extending through any considerable length of the tube.

Third.—Where in order to secure the proper shape it is necessary that the side walls flare widely in any plane, the walls in the other plane are made convergent instead of divergent in order to positively force the water to diverge in the first plane. This, like the first condition or principle referred to, keeps the tube filled at all times.

Figure 2:
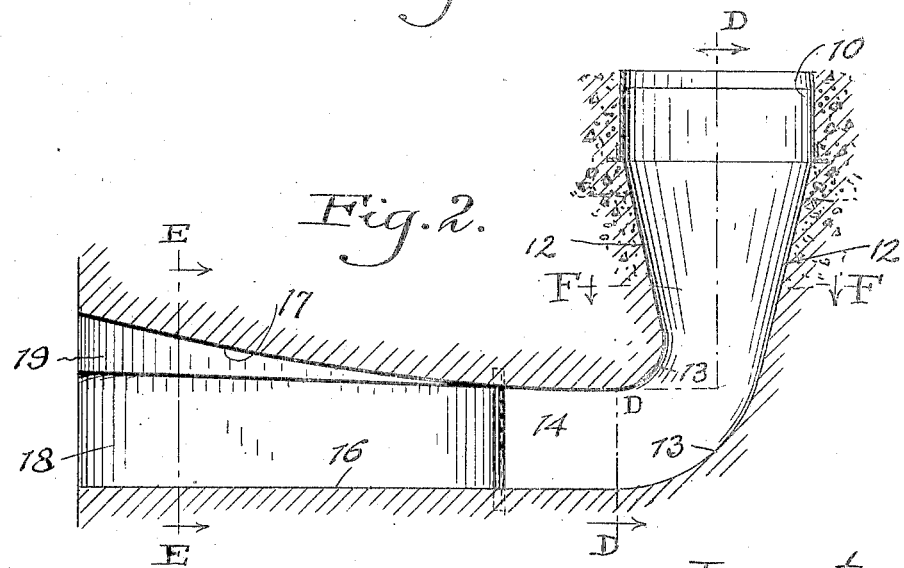
Figure 3:
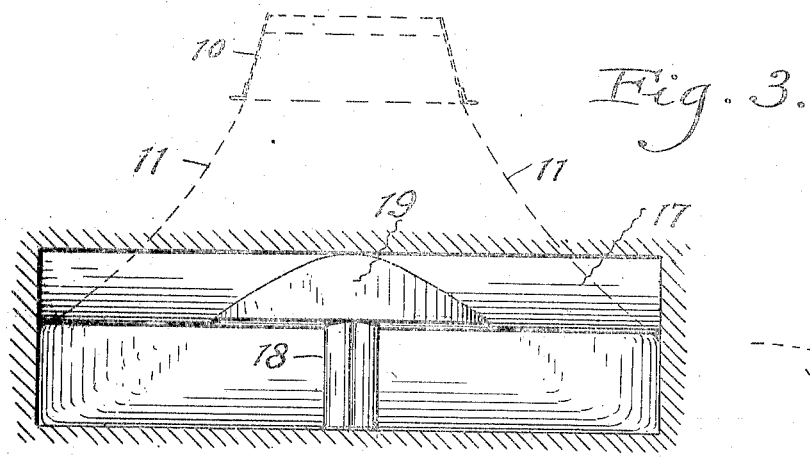
Figure 4:
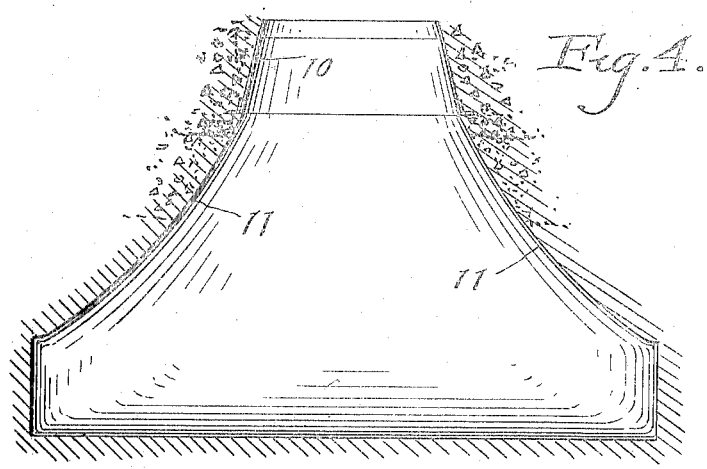
Figure 6:
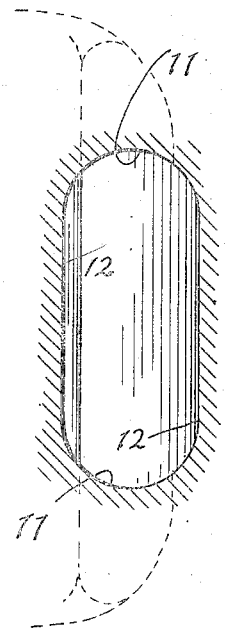
Figure 5:
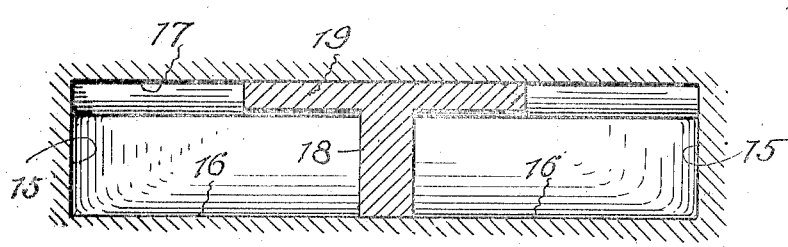

Though my invention does not necessarily involve all the above principles or structural characteristics, in the accompanying sheets of drawings I have illustrated the preferred form of the tube wherein they are all incorporated, and in the drawings, Fig. 1 is a top plan view of the tube; Fig. 2 is a vertical sectional view substantially along the irregular line B, B, B, B, of Fig. 1 looking in the direction indicated by the arrows; Fig. 3 is an end view looking toward the right of Fig. 1 or toward the discharge end of the tube; Fig. 4 is a vertical sectional view substantially along the irregular line D, D, D, D, of Fig. 2; Fig. 5 is a vertical sectional view substantially along the line E, E of Fig. 2; and Fig. 6 is a horizontal sectional view substantially along the line F, F of Fig. 2 looking in the direction indicated by the arrows.

The draft tube made in accordance with my invention may be formed of metal, i. e., sheet metal or cast metal, or of concrete, or of both metal and concrete. That shown in the drawings is formed chiefly of concrete, concrete draft tubes being preferred for certain installations, while for others metal tubes may be employed.

In the drawings I have illustrated a draft tube for a vertical turbine, but while its principal use may be in connection with vertical turbines, it is not necessarily confined thereto as already stated. The draft tube herein illustrated has an upper portion 10, the top of which is circular or substantially circular and may connect directly with the turbine casing, or if desired, there may be a transition tube of suitable shape between the top portion designated by the reference character 10 and the turbine casing.

It will be noted by reference to Fig. 2 that opposite sides of the portion 10 of the tube in the plane of the section shown in this figure are parallel, but at right angles to the section of Fig. 2, the opposite sides diverge somewhat as shown in Fig. 3 and Fig. 4. Between the portion 10 and the bend beneath it the tube flares laterally very materially as shown at 11 in Figs. 3 and 4; that is to say, it flares decidedly in a plane at right angles to the section of Fig. 2 or parallel to the sections of Figs. 3 and 4. In this portion of the tube the front and rear wall, however, do not flare or diverge, but on the other hand, they preferably are convergent, as shown at 12, 12 in Fig. 2, particularly when there is a wide lateral flare as indicated at 11, 11. The side walls 11, 11 in this portion of the tube continue to diverge, and the front and rear walls 12, 12 continue to converge to or substantially to the bend, the inner and outer walls of which are designated 13, but in this bend there is no flare in the plane of the section of Fig. 2, and there is only a slight flare at the ends of the bend.

The effect of the diverging side walls 11, 11 and converging front and rear walls 12, 12 is to convert the stream of water which is substantially circular when it enters the tube, to a relatively thin sheet or thin elongated body at the entrance of the bend; that is to say, the stream has been spread laterally very decidedly and it has been reduced in thickness in a front to rear direction which enables the use of a short bend and a great deal less difference between the inner and outer radii than would be the case if at the entrance of the bend the column of water were substantially circular in cross-section as heretofore. There is, however, a gradual increase in the cross-sectional area from the top of the tube to the bend and also through the horizontal portion of the tube yet to be referred to, the effect being a gradual deceleration of the velocity of the water and regain of energy in the form of pressure.

At the ends of the bend laterally of the axis thereof the curved and flared surfaces are merged so as to avoid abrupt changes and pockets, but by the use of fillets curved guiding walls are formed in these portions which gradually change the direction of the water at the ends of the bend with minimum eddying and frictional losses.

The bend or elbow discharges into a relatively flat horizontal section which may be designated generally by the reference character 14. The upright sides 15 of this portion may be and preferably are parallel, as is best seen by reference to Fig. 1. However, in some instances they may be slightly convergent, and in some cases it may be advisable that they be slightly divergent. The bottom wall 16 of the horizontal or outlet portion of the tube may be horizontal but if so the top wall 17 flares upwardly toward the discharge end of the tube as shown in the drawings so as to obtain the desired gradual increase in cross-sectional area until the extreme end of the tube is reached.

Between the top and bottom walls there may be a pier such as indicated at 18, but this is provided chiefly for structural purposes and may be omitted in certain installations.

I prefer to provide in the top wall 17 of the horizontal portion of the tube a centrally disposed roof projection 19, the outline of which is indicated in Fig. 1. This is desirable at times to prevent the water from failing to fill the discharge section of the tube. The upper middle portion of the discharge section has a tendency to be the region of lowest velocity and under certain conditions this velocity may become zero or water may even be sucked backwards from the tail-race toward the bend. This condition is undesirable from an efficiency standpoint and is overcome by the projecting portion of the roof.

This roof projection 18 as herein illustrated, is of gradually decreasing thickness from the outlet end of the tube inward, as clearly shown in Fig. 2, the decreased thickness being provided by the downward curvature of the top wall 17 viewing the same from the discharge end and as it extends in toward the bend. The bottom surface of the roof projection 18 may be horizontal, but preferably it is slightly inclined, the distance from the bottom surface of the projection to the bottom wall 16 preferably slightly increasing toward the discharge end of the tube as I have shown in Fig. 2. Additionally, in this instance the side walls of the roof projection which are vertical, are curved, the end of the roof projection toward the discharge end of the tube being curved or rounded, and the roof projection gradually widening out inwardly until it reaches a given width some distance back from the discharge end, from which point the side walls continue in parallel relation until they merge into the curved top wall 17. However, while I have illustrated the roof projection 18 of a given shape described in some detail, and while this shape of roof projection has proven by careful experiment and testing to give very good results, nevertheless, it may be otherwise shaped.

With the tube above described, the water issues from the outlet end of the horizontal portion at low velocity, and the velocity at different points of the outlet end is substantially the same. There is a gradual deceleration of velocity from the inlet to the outlet end and consequent regain of energy with the velocity head converted to pressure head as is desired. Furthermore, the conversion from velocity head to pressure head takes place with practically minimum eddying and loss so that the efficiency of the tube is high. This is due in large measure to the fact that the stream of water entering the tube is converted from substantially circular shape to an elongated or narrow sheet at and just above the bend, making it possible to gradually increase the cross-sectional area and to turn the water without the water leaving the surface of the tube, which therefore remains filled throughout. Furthermore, the difference in velocities at the inner and outer surfaces of the bend is comparatively small, and still further, the flat, elongated shape of the tube not only has the advantages just stated above, but the swirling or whirling of the water due to the action of the rotating runner is practically dissipated before the water is turned at the bend, and this in itself has a tendency to reduce losses due to eddying and prevents the so-called "piling up" of the water at one side of the discharge section of the tube and allows the substantially uniform discharge at all points of the outlet end as already pointed out.

Having described my invention, I claim:

1. A draft tube for a water turbine, shaped to convert the column or stream of water leaving the runner and while substantially coaxial therewith into an elongated narrow sheet.

2. A draft tube having a bend and shaped in advance of the bend to convert the stream of water into a form elongated in cross-section.

3. A draft tube having a gradually enlarging cross-sectional area with the tube flared or inclined in one plane only for a given length in any part of the tube.

4. A draft tube with a straight portion having walls divergent in one plane and convergent in another plane.

5. A draft tube having a bend, and a portion in advance of the bend, widened in one direction and flattened in another so as to provide a narrow elongated cross-section.

6. A draft tube having an inlet portion, an outlet portion at an angle thereto, and a curved bend or elbow between said portions, the inlet portion being shaped to convert the stream into a relatively narrow elongated stream at the entrance of the bend.

7. A draft tube having an inlet portion shaped so as to gradually convert the body of water flowing therethrough into a narrow elongated shape, a short bend, and a flat shallow outlet portion gradually increasing in cross-sectional area toward the outer end.

8. A draft tube having an inlet portion shaped so as to gradually convert the body of water flowing there-through into a narrow elongated shape, a short bend, and a flat shallow outlet portion with a roof projection which provides greater depth along the sides than at the center of the outlet portion.

9. A draft tube having an inlet portion shaped so as to gradually convert the body of water flowing therethrough into a narrow elongated shape, a short bend, and a flat shallow outlet portion having an upwardly curved top wall.

10. A draft tube having an inlet portion shaped so as to gradually convert the body of water flowing therethrough into a narrow elongated shape, a short bend, and a flat shallow outlet portion having an upwardly curved top wall with a roof projection at the center thereof.

11. A draft tube having a vertical portion with walls divergent in one plane and convergent in another plane so as to convert the streams of water entering the tube into a form enlongated in cross section.

12. A draft tube having a vertical portion, a bend, and a portion extending substantially horizontally from the bend, the vertical portion being shaped to convert the stream into a relatively narrow elongated sheet.

13. A draft tube having an inlet portion, an outlet portion at an angle thereto, and a curved bend or elbow between said portions, the tube being of gradually increasing cross-sectional area and being widened or flared laterally and reaching substantially its full width in the vicinity of the bend.

In testimony whereof, I hereunto affix my signature.

HARRY E. POPP.